US 10,947,754 B2

(12) United States Patent
Sorkin (10) Patent No.: US 10,947,754 B2
(45) Date of Patent: Mar. 16, 2021

(54) BARRIER CABLE ANCHOR (71) Applicant: Felix Sorkin, Stafford, TX (US)

(72) Inventor: Felix Sorkin, Stafford, TX (US)

(*) Notice: Subject to any disclaimer, the term of this patent is extended or adjusted under 35 U.S.C. 154(b) by 475 days.

(21) Appl. No.: 15/963,387

(22) Filed: Apr. 26, 2018

(65) Prior Publication Data
US 2018/0313047 A1 Nov. 1, 2018

Related U.S. Application Data (60) Provisional application No. 62/490,914, filed on Apr. 27, 2017.

(51) Int. Cl.
E04H 17/10 (2006.01)
F16B 5/02 (2006.01)
E01F 15/06 (2006.01)
F16G 11/04 (2006.01)

(52) U.S. Cl.
CPC .............. E04H 17/10 (2013.01); E01F 15/06 (2013.01); F16B 5/02 (2013.01); F16G 11/048 (2013.01)

(58) Field of Classification Search
CPC ...... E01F 15/06; E04F 11/1859; E04H 17/04; E04H 17/06; E04H 17/08; E04H 17/10; E04H 17/12; E04H 17/26; E04H 17/261; E04H 17/266; F16G 11/04; F16G 11/044; F16G 11/048; F16G 11/10; F16G 11/101; F16G 11/12; Y10T 24/3969; Y10T 24/3978; Y10T 24/3996; Y10T 403/7069; Y10T 403/76
USPC .......... 403/374.4, 409.1; 256/32, 37, 47, 54, 256/DIG. 3; 24/115 M, 136 B, 136 R
See application file for complete search history.

(56) References Cited

U.S. PATENT DOCUMENTS

| 3,049,775 A | * | 8/1962 | Ondeckelmerj ........ E04C 5/122 403/365 |
| 3,163,904 A | * | 1/1965 | Ziolkowski ........... F16G 11/048 403/365 |
| 4,896,470 A | | 1/1990 | Sorkin |
| 5,015,023 A | * | 5/1991 | Hall ...................... F16G 11/048 24/136 R |
| 5,072,558 A | | 12/1991 | Sorkin et al. |
| 5,440,842 A | | 8/1995 | Sorkin |
| 5,701,707 A | | 12/1997 | Sorkin |

(Continued)

FOREIGN PATENT DOCUMENTS

| EP | 3305987 A1 | 4/2018 |
| JP | 2011058574 A | 3/2011 |

OTHER PUBLICATIONS

Extended Search Report issued in European Application No. 18169830. 9, dated Sep. 21, 2018, 7 pages.

Primary Examiner — Josh Skroupa
(74) Attorney, Agent, or Firm — Adolph Locklar (57) ABSTRACT A barrier cable anchor may include an anchor body including an inner surface, a retainer having a retainer body and the retainer body being retained to the anchor body, a collar having an outer surface and an inner surface and being at least partially within the anchor body, one or more wedges positioned within the tapered inner surface of the collar, and a nut engaging the collar and retained to the anchor body. The retainer may include a pin end retained to the inner surface of the anchor body and the nut may include a threaded outer surface so that rotating the nut within the anchor body advances the retaining collar and thereby tensions the barrier cable.

27 Claims, 7 Drawing Sheets (56) References Cited

U.S. PATENT DOCUMENTS

| | | |
|---|---|---|
| 5,720,139 A | 2/1998 | Sorkin |
| 5,749,185 A | 5/1998 | Sorkin |
| 5,755,065 A | 5/1998 | Sorkin |
| 5,770,286 A | 6/1998 | Sorkin |
| 5,788,398 A | 8/1998 | Sorkin |
| 5,839,235 A | 11/1998 | Sorkin |
| 5,897,102 A | 4/1999 | Sorkin |
| 6,012,867 A | 1/2000 | Sorkin |
| 6,017,165 A | 1/2000 | Sorkin |
| 6,023,894 A | 2/2000 | Sorkin |
| 6,027,278 A | 2/2000 | Sorkin |
| 6,098,356 A | 8/2000 | Sorkin |
| 6,151,850 A | 11/2000 | Sorkin |
| 6,176,051 B1 | 1/2001 | Sorkin |
| 6,234,709 B1 | 5/2001 | Sorkin |
| 6,381,912 B1 | 5/2002 | Sorkin |
| 6,393,781 B1 | 5/2002 | Sorkin |
| 6,513,287 B1 | 2/2003 | Sorkin |
| 6,560,939 B2 | 5/2003 | Sorkin |
| 6,631,596 B1 | 10/2003 | Sorkin |
| 6,733,203 B2 * | 5/2004 | Carlsen ................. F16G 11/048 403/409.1 |
| 6,761,002 B1 | 7/2004 | Sorkin |
| 6,817,148 B1 | 11/2004 | Sorkin |
| 6,843,031 B1 | 1/2005 | Sorkin |
| 7,424,792 B1 | 9/2008 | Sorkin |
| 7,657,976 B2 * | 2/2010 | Nakamura ............ F16G 11/108 24/136 A |
| 7,676,997 B1 | 3/2010 | Sorkin |
| D615,219 S | 5/2010 | Sorkin |
| 7,823,345 B1 | 11/2010 | Sorkin |
| 7,841,061 B1 | 11/2010 | Sorkin |
| 7,856,774 B1 | 12/2010 | Sorkin |
| 7,866,009 B1 | 1/2011 | Sorkin |
| 7,950,196 B1 | 5/2011 | Sorkin |
| 8,015,774 B1 | 9/2011 | Sorkin |
| 8,065,845 B1 | 11/2011 | Sorkin |
| 8,069,624 B1 | 12/2011 | Sorkin |
| 8,087,204 B1 | 1/2012 | Sorkin |
| 8,251,344 B1 | 8/2012 | Sorkin |
| 9,097,014 B1 | 8/2015 | Sorkin |
| 2014/0138596 A1 | 5/2014 | Ross |
| 2018/0003202 A1 * | 1/2018 | White ..................... F16G 11/04 |
| 2018/0094436 A1 | 4/2018 | Sorkin |
| 2018/0094450 A1 | 4/2018 | Sorkin |

* cited by examiner

BARRIER CABLE ANCHOR

CROSS-REFERENCE TO RELATED APPLICATIONS

This application is a non-provisional application which claims priority from U.S. provisional application No. 62/490,914, filed Apr. 27, 2017, which is incorporated by reference herein in its entirety.

TECHNICAL FIELD/FIELD OF THE DISCLOSURE

The present disclosure relates generally to mechanical anchors, and specifically to mechanical anchors for cables.

BACKGROUND OF THE DISCLOSURE

Barrier cable installations are restraint systems used in parking garages, along highways, and in other structures. Barrier cable installations typically include one or more barrier cables placed under tension to restrain movement of vehicles and pedestrians. The barrier cables are typically extended between structures such as columns, walls, or posts and are anchored thereto.

SUMMARY

The present disclosure provides for a barrier cable anchor for coupling a barrier cable to a concrete member. A barrier cable anchor may include an anchor body, which may include an inner surface. The barrier cable anchor may further include a retainer, the retainer having a retainer body and optionally a head, the head having a width greater than that of the retainer body and the retainer body being retained to the anchor body. The retainer body may be a threaded pin that engages a threaded inner surface of the anchor body, a threaded box that engages a threaded outer surface of the anchor body, or any other mechanical configuration that couples the retainer to the anchor body. The barrier cable anchor may further include a collar, the collar having a collar outer surface, the collar positioned at least partially within the anchor body, the collar including an inner surface, one or more wedges positioned within the inner surface of the collar, and a nut that engages the collar and is retained to the anchor body. In some embodiments, the nut may include a threaded inner surface that is threaded onto the outer surface of the anchor body, a threaded outer surface that is threaded into the anchor body, or any other mechanical configuration that couples the nut to the anchor body.

The nut may include a driving head. The barrier cable anchor may further include an anchor plate and the anchor body may be coupled to the anchor plate by the retaining pin. The collar outer surface may be unthreaded. The barrier cable anchor may further include a cap retained to the anchor body and a spring positioned between the cap and the one or more wedges. The wedges may be tapered. The barrier cable anchor may further include an end plug inserted into the anchor body.

In some embodiments, a barrier cable system may include a first concrete member and a second concrete member, each concrete member including: an anchor plate, each anchor plate having at least one anchor hole therethrough; and a barrier cable anchor, each barrier cable anchor positioned within a hole of the respective anchor plate, each barrier cable anchor coupling the barrier cable to the respective concrete member. Each barrier cable anchor may include an anchor body, the anchor body including an inner surface, the inner surface defining a bore; a retainer having a pin end and optionally a head, the head having a width greater than that of the hole, the retainer being retained to the anchor body; a collar, the collar having a collar outer surface, the collar positioned at least partially within the anchor body, the collar including an inner surface; one or more wedges positioned within the inner surface of the collar; and a nut engaging the collar and retained to the inner surface of the anchor body. The nut may include a driving head. The anchor body may be coupled to the anchor plate by the retainer.

The barrier cable system may further include a cap retained to the anchor body and a spring positioned between the cap and the one or more wedges. The outer surface of the collar may be unthreaded. The wedges may be tapered.

In some embodiments, a method includes a) providing a concrete member, b) coupling an anchor plate to the concrete member, the anchor plate having at least one hole therethrough, c) assembling a barrier cable anchor to the anchor plate including the steps of: i) supplying an anchor body, the anchor body including an inner surface and first and second ends and defining a bore, ii) inserting a retainer through a hole in the anchor plate and into engagement with the anchor body at a first end of the anchor body, iii) inserting one or more wedges and a collar at least partially into the anchor body at a second end of the anchor body, and iv) retaining the collar at least partially within the anchor body, d) inserting a barrier cable into the barrier cable anchor and the collar so as to engage the wedges, and e) tensioning the barrier cable by advancing the collar into the anchor body.

Step d) may be performed before step c.iii). Step c) may further include before step c.iii) the steps of iia) inserting a cap into the anchor body and retaining the cap at a point within the bore of the anchor body and iib) inserting a spring into the anchor body, such that the spring is retained between the cap and the wedges. The collar may have a collar outer surface that is not threaded and step c.iii) may include sliding the collar into the anchor body. Step c.iv) may include retaining a nut to the second end of the anchor body, the nut engaging the collar. The nut may threadedly engage the anchor body and step e) may comprise rotating the nut. The method may further include positioning an end plug in the second end of the anchor body after step e).

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
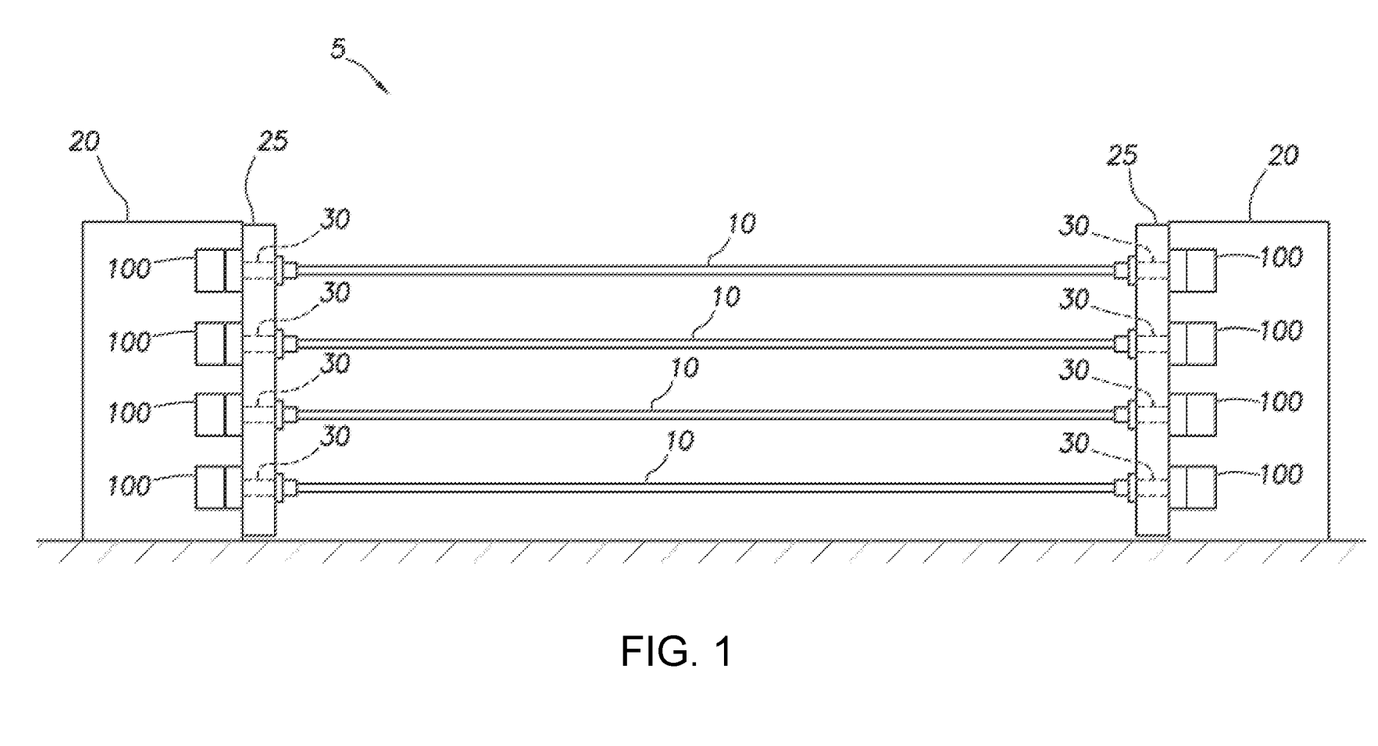
FIG. 1 depicts a barrier cable system consistent with at least one embodiment of the present disclosure.

FIG. 1 depicts a barrier cable system 5. Barrier cable system 5 may include one or more barrier cables 10, concrete members 20, anchor plates 25, and barrier cable anchors 100. Barrier cables 10 may be formed of metal and may be placed under tension to restrain movement of vehicles and pedestrians. Barrier cables may extend between two or more concrete members 20. Examples of concrete members 20 may include, but are not limited to, columns, walls, and posts.

In some embodiments, barrier cables 10 may be coupled to concrete members 20 by barrier cable anchors 100. In some embodiments, barrier cable anchors 100 may be coupled to a concrete member 20 by anchor plate 25. Anchor plate 25 may be, for example and without limitation, a plate, bar, or cylinder. In some embodiments, anchor plate 25 may be constructed of metal or polymer. Although described herein as a plate, anchor plate 25 may be any structure for mounting barrier cable anchor 100 to concrete member 20, and may be one or more pieces of rebar. Anchor plate 25 may be coupled to concrete member 20 by mechanical fasteners, such as bolts, or be welded. In other embodiments, anchor plate 25 may be integrally formed with concrete member 20. Anchor plate 25 may include one or more holes 30, each hole 30 positioned to receive a corresponding barrier cable anchor 100. Hole 30 may have, in non-limiting embodiments, a cylindrical, square, hexagonal partially hexagonal, or partially square cross section. In other embodiments, one or more barrier cable anchors 100 may be at least partially embedded in concrete member 20 as concrete member 20 is cast. In some embodiments, anchor plate 25 may likewise be at least partially embedded into concrete member 20.

Figure 2:
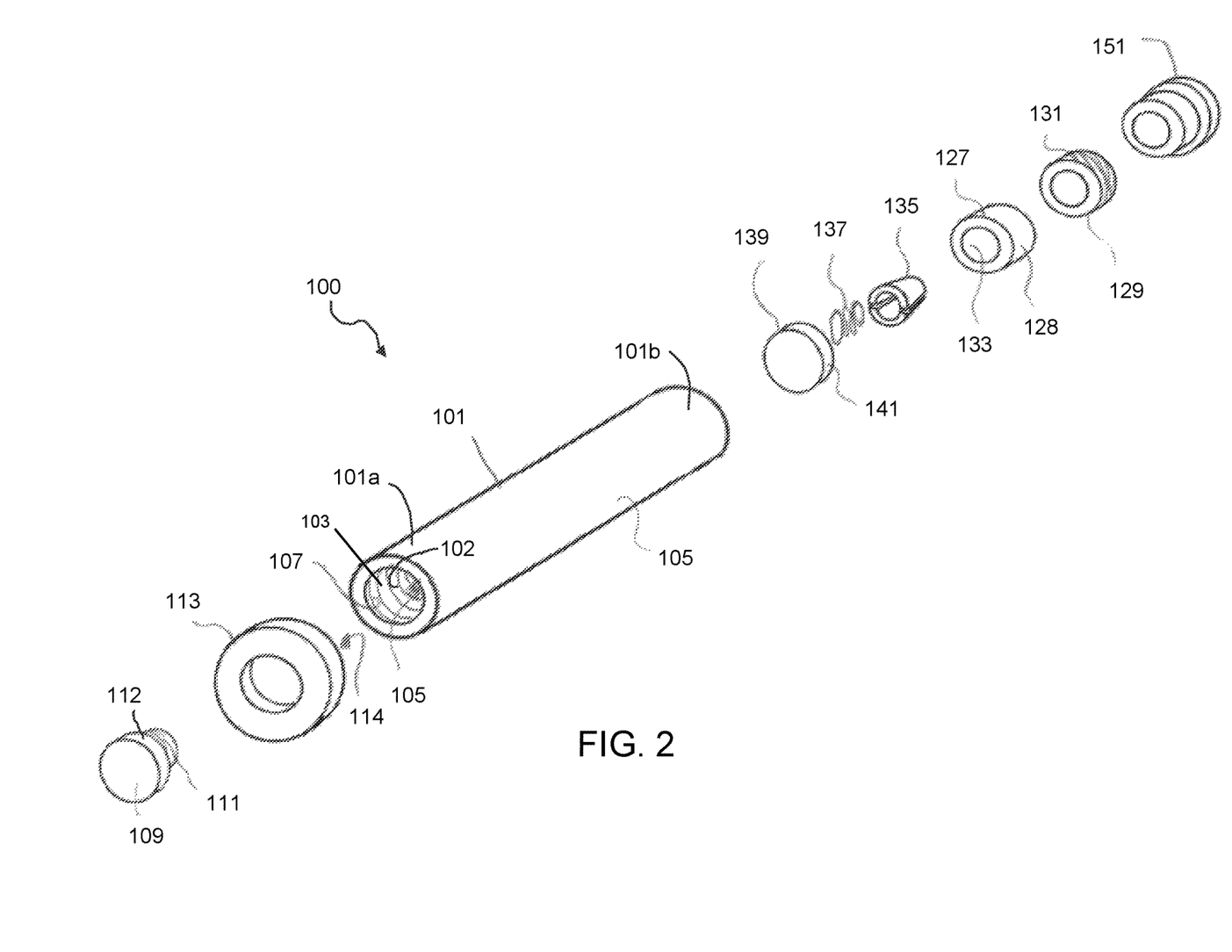
FIG. 2 depicts an exploded view of a barrier cable anchor consistent with at least one embodiment of the present disclosure.

Referring now to FIGS. 2-5, in some embodiments, barrier cable anchor 100 may include an anchor body 101 having first and second ends 101a and 101b, respectively. Anchor body 101 may be a tube with a bore 102 therethrough, bore 102 defined by anchor body inner surface 103 and extending between first end 101a and second end 101b, as shown in FIG. 2. Anchor body inner surface 103 may be cylindrical or generally cylindrical. Anchor body 101 may include an anchor body outer surface 105. In some embodiments, anchor body outer surface 105 may be cylindrical. In some embodiments, anchor body outer surface 105 may have a square, hexagonal partially hexagonal, or partially square cross section. In some embodiments, anchor body 101 may include internal thread 107 formed on anchor body inner surface 103.

In some embodiments, barrier cable anchor 100 may include a retainer 109 including a retainer body 111 and a head 112. Retainer body 111 may be retained to or coupled to anchor body 101 at first end 101a of anchor body 101. As used herein, "retain" refers to, retention by, for example and without limitation, threading, pins, snaps, mechanical welding, a friction fit, or any similar type of closure known in the art. Thus, retainer body 111 may be a threaded pin that engages a threaded inner surface of the anchor body, a threaded box that engages a threaded outer surface of the anchor body, or any other mechanical configuration that mechanically couples the retainer to the anchor body.

In the embodiments of FIGS. 2-5, retainer body 111 may include threads that correspond with and are adapted to mate with an internal thread 107 of anchor body 101. In some such embodiments, retainer 109 (when retainer 109 is a threaded pin) may be, retained, for example, by partially threading, into anchor body 101 and may be prevented or retarded from rotating relative to anchor body 101 by welding anchor body 101 to retainer 109 or by other chemical or mechanical means including, for example and without limitation, pins, snaps, mechanical or chemical welding, a friction fit, or any other similar type of closure known in the art. In certain embodiments, retainer 109 may be a threaded member, such as a bolt. Head 112 may have, in non-limiting embodiments, a cylindrical, square, hexagonal partially hexagonal, or partially square cross section. In some embodiments, head 112 has a larger width than the width of bore 102. In some embodiments, head 112 may have a width equal to or greater than the width of anchor body 101.

In some embodiments, barrier cable anchor 100 may include an anchor plate 113. Anchor plate 113 may include an anchoring face 114 positioned to retain barrier cable anchor 100 in place within concrete member 20. In some embodiments, anchor plate 113 may correspond to anchor plate 25 (FIG. 1). Anchor plate 113 includes hole 115 therethrough. In some embodiments, hole 115 may have a width at least as great as that of bore 102 but not greater than the outside width of anchor body 101. In some embodiments, hole 115 may correspond to hole 30 (FIG. 1). Head 112 of retainer 109 (when retainer 109 is a threaded pin) may have a width at least as great as that of hole 115, so that when retainer body 111 extends through hole 115 and into bore 102, retainer 109 is prevented from passing through anchor plate 113.

Figure 4:
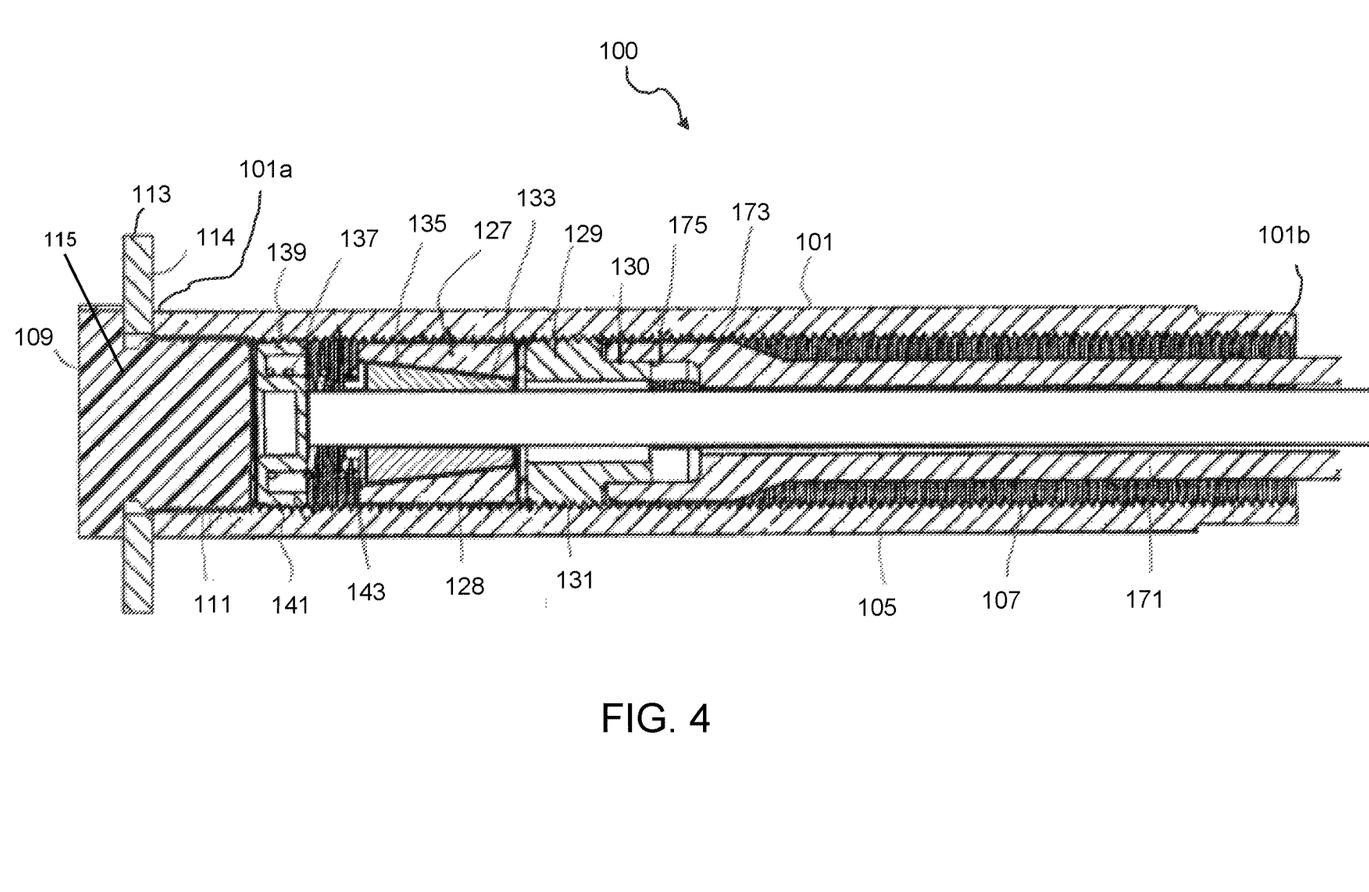
FIG. 4 depicts a cross section of the barrier cable anchor of FIG. 2 during a tightening operation.
Figure 5:
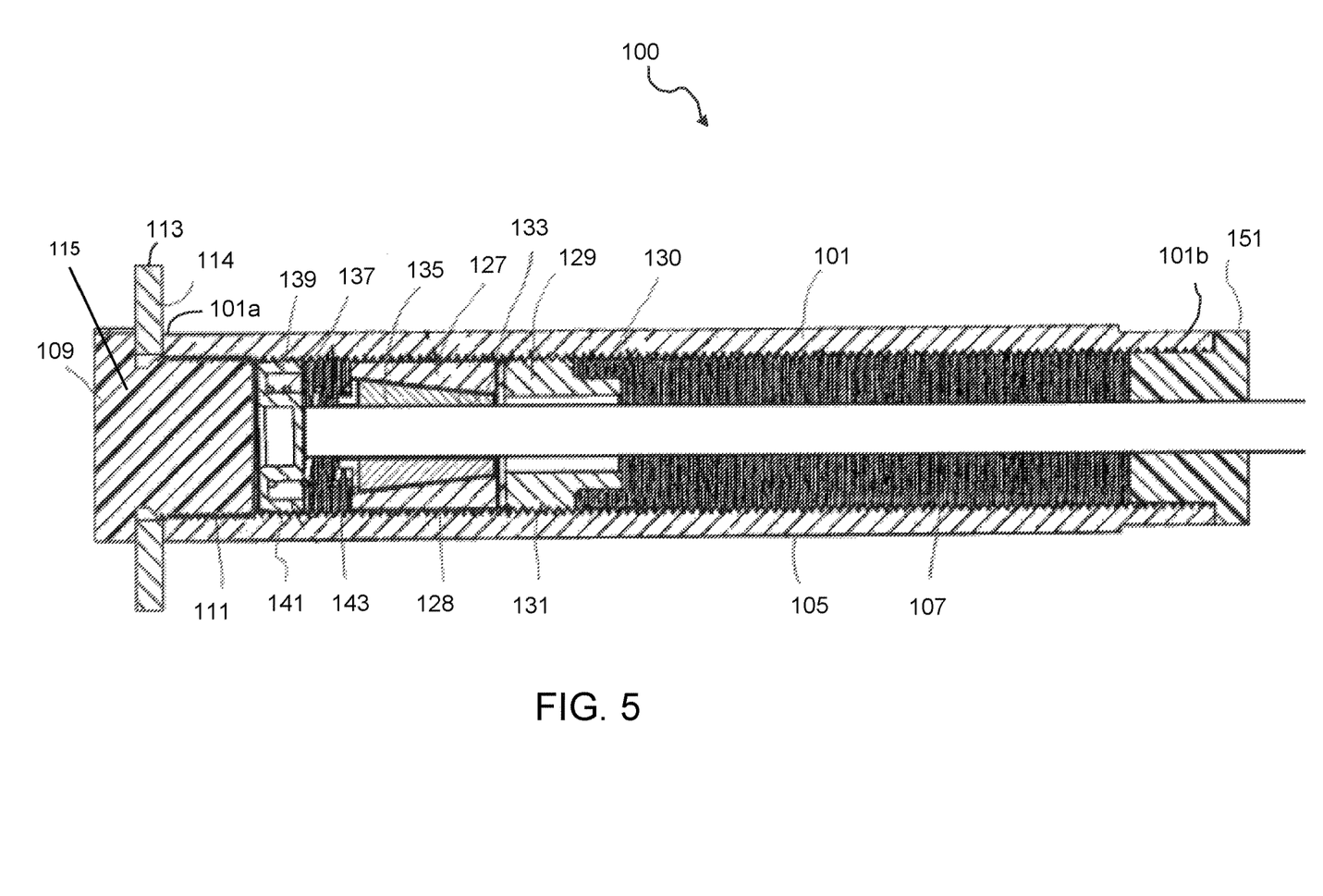
FIG. 5 depicts a cross section of the barrier cable anchor of FIG. 2 in a tightened position.
Figure 6:
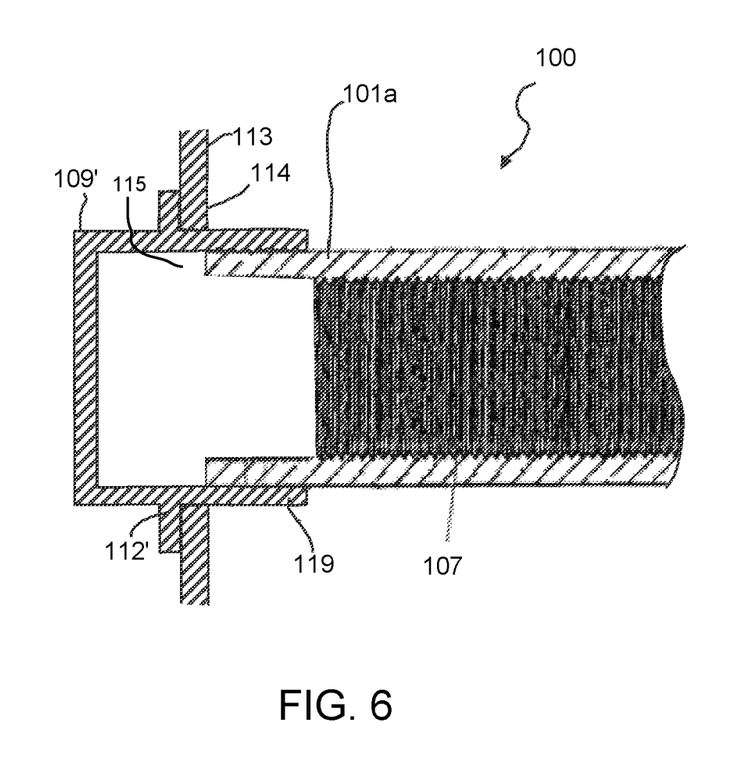
FIG. 6 depicts a cross section of an alternative embodiment of a portion of the anchor of FIG. 2.

As mentioned above, retainer 109 is not limited to the configuration illustrated in FIGS. 2-5 and may have other configurations. By way of example, as illustrated in FIG. 6, retainer 109' may include a female (box) end 119 and a flange or head 112' extending radially therefrom. Female (box) end 119 may be configured to pass through hole 115 in anchor plate 113 and threadedly engage the outside of anchor body 101, whereas head 112' is larger than hole 115, allowing head 112' to engage anchor plate 113. In still other embodiments, retainer 109, 109' may engage the inside or outside of anchor body 101 by other mechanical means, including but not limited to crimping, welding, bayonet-type connection, interference fit, adhesive, or the like.

Referring again to FIGS. 2-5, in some embodiments, barrier cable anchor 100 may also include a collar 127. Collar 127 may have, in non-limiting embodiments, a cylindrical, square, hexagonal partially hexagonal, or partially square cross section and may be disposed in the second end of barrier cable anchor 100. In some embodiments, collar 127 may be a hollow cylinder having a collar outer surface 128 and an inner surface 133. In some embodiments, inner surface 133 is tapered. In certain embodiments, collar outer surface 128 is not threaded. Collar outer surface 128 may be sized such that collar 127 is configured to slide within the bore defined by anchor body inner surface 103 of anchor body 101. Collar 127 may be at least partially inserted, and in some embodiments, completely inserted, into anchor body 101 at second end 101b of anchor body 101.

In some embodiments, collar 127 may be retained within anchor body 101 by a nut 129. Nut 129 may have, in non-limiting embodiments, a cylindrical, square, hexagonal partially hexagonal, or partially square cross section. In some embodiments, the nut may include a threaded inner surface that is threaded onto the outer surface of the anchor body, a threaded outer surface that is threaded into the anchor body, or any other mechanical configuration that mechanically couples the nut to the inside or outside of anchor body 101, including but not limited to crimping, a bayonet-type connection, welding, interference fit, adhesive, or the like.

In the non-limiting embodiments illustrated in FIGS. 2-5, nut 129 may be a hollow cylinder having a threaded nut outer surface 131. Nut outer surface 131 may be retained to anchor body inner surface 103 of anchor body 101. In some embodiments, nut outer surface 131 may include threads that correspond with and are configured to mate with internal thread 107 of anchor body 101. Nut 129 may be retained by, such as, for example and without limitation, threaded coupling, to anchor body 101 at second end 101b of anchor body 101 once collar 127 is inserted into anchor body 101. While nut 129 is illustrated as having male threads that engage the threaded bore 102, collar 127 may alternatively be retained to anchor body 101 by other mechanical means, including but not limited to a female threaded collar that engages the outside of anchor body 101 in the manner of retainer 109' of FIG. 6.

Similarly, while various components are described herein as engaging the first or second "end" of anchor body 101, that terminology is intended to describe the relative positions of those components. In particular, the first and second "ends" indicate the respective positions of the two mechanical engagements through which the tensile forces are applied to the barrier cable anchor. Hence, the invention is not limited to embodiments in which the components are located at one end or another, or even exactly at a terminus, of the anchor body 101. Rather, description of items as engaging the first or second end includes items that may each engage the anchor body at a point in the middle section of the anchor body.

Referring to FIG. 4, in some embodiments, nut 129 may include a driving head 130, which may be adapted for engagement by a tensioning wrench 171. Tensioning wrench 171 may include a tensioning coupler 173 having inner surface 175 that is adapted to engage driving head 130 of nut 129. Tensioning coupler 173 may, for example, be a socket. In some such embodiments, tensioning coupler inner surface 175 and driving head 130 may have corresponding profiles including, for example and without limitation, a square, hexagonal, or other polygonal cross section or may include one or more holes and corresponding pins, one or more splines, or other coupling features known in the art. In some embodiments, tensioning wrench 171 may be a cylinder. In some embodiments, tensioning wrench 171 may be a cylinder with a longitudinal cutout extending the length of tensioning wrench 171 to allow tensioning wrench 171 to be used while barrier cable 10 is installed to barrier cable anchor 100.

With respect to FIGS. 2-5, collar 127 may receive one or more wedges 135 therein. Wedges 135 may bear on tapered inner surface 133. The diameter of collar tapered inner surface 133 may be smallest where collar 127 is retained by nut 129. Any number of wedges 135 may be used, including a single wedge 135 or two, or three or more wedges 135. As shown best in FIGS. 3-5, wedges 135 may be tapered such that the taper of wedges 135 corresponds to the taper of collar tapered inner surface 133.

Wedges 135 may be used to retain barrier cable 10 within collar 127 when barrier cable 10 is inserted into collar 127. Wedges 135 may be tapered such that any tensile force applied to the length of barrier cable 10 may cause wedges 135 to be pulled farther into collar 127 and to bear on tapered inner surface 133, thereby increasing normal force on the sides of barrier cable 10, and resisting the removal of the barrier cable 10 from collar 127.

In some embodiments, wedges 135 may be urged into collar 127 by a spring 137. Spring 137 may be positioned between wedges 135 and a cap 139. Cap 139 may be a cap having a threaded outer surface 141 and may be retained, such as by threaded coupling, to internal thread 107 of anchor body 101. In alternative embodiments, cap 139 may be non-threaded and may be a cap inserted with a friction or press fit into the interior of anchor body 101. In some embodiments, a spring plate 143 may be positioned between spring 137 and wedges 135.

In some embodiments, during assembly of barrier cable anchor 100, cap 139 may be inserted into second end 101b of anchor body 101, followed by spring plate 143 if present, wedges 135, and collar 127. Nut 129 may then be threadedly coupled to second end 101b of anchor body 101 such that nut 129 retains spring 137, wedges 135, and collar 127 within anchor body 101.

Figure 3:
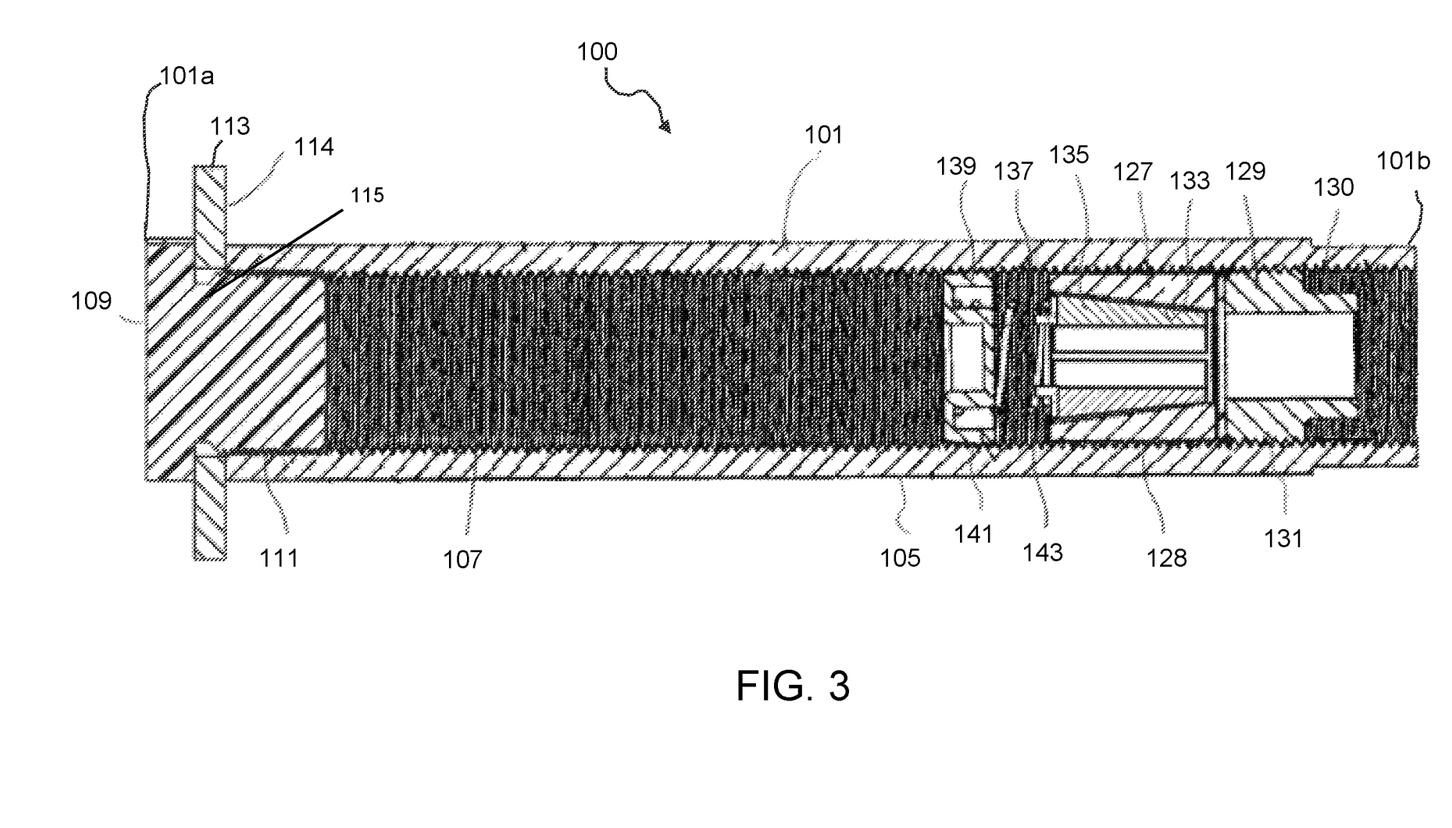
FIG. 3 depicts a cross section of the barrier cable anchor of FIG. 2.

In some embodiments, once assembled as depicted in FIG. 3, a barrier cable anchor 100 may be used to anchor barrier cable 10 to concrete member 20. Barrier cable 10 may be inserted into second end 101b of anchor body 101 such that barrier cable 10 enters collar 127 through nut 129 and engages wedges 135, thereby retaining barrier cable 10 to barrier cable anchor 100. Nut 129 may then be rotated, causing further insertion of collar 127 into anchor body 101 as depicted in FIGS. 4 and 5, and decreasing the distance between barrier cable 10 and first end 101a of anchor body 101. Tension may be thereby increased in barrier cable 10.

In some embodiments, when barrier cable 10 is tensioned and access to nut 129 is not required, an end plug 151 may be inserted into second end 101b of anchor body 101. In some non-limiting embodiments, end plug 151 may be formed from rubber. End plug 151 may, for example and without limitation, retard or prevent fluid ingress into the interior of anchor body 101 through second end 101b of anchor body 101. In some embodiments, end plug 151 may be positioned about barrier cable 10 before barrier cable 10 is inserted into anchor body 101. In other embodiments, end plug 151 may be present with or in anchor body 101 when barrier cable 10 is inserted therethrough and may be removed from anchor body 101 and slid along barrier cable 10 so as to allow access to nut 129. In other embodiments, end plug 151 may include a longitudinal slit that allows end plug 151 to be placed onto barrier cable 10 after barrier cable 10 engages barrier cable anchor 100.

Figure 7:
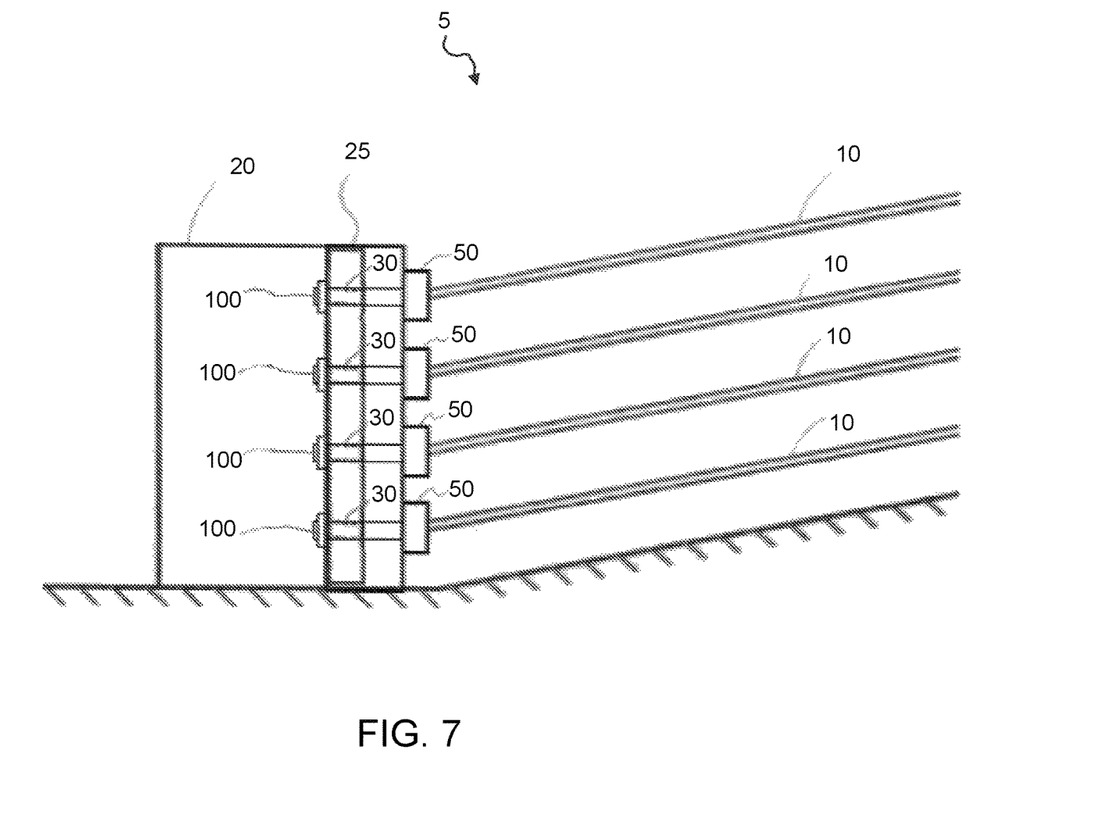
FIG. 7 depicts a barrier cable system consistent with at least one embodiment of the present disclosure.

In some embodiments, barrier cable anchor 100 may be used at a right angle to concrete member 20 such that barrier cable 10 extends generally horizontally. In other embodiments, as depicted in FIG. 7, barrier cable 10 may extend from concrete member 20 such that barrier cable 10 extends at an angle to concrete member 20. For example and without limitation, such an embodiment may be used for a barrier cable system 5 used at a sloped area such as a ramp. In some embodiments, barrier cable system 5 may include cable angler 50. Cable angler 50 may be positioned about barrier cable 10 and secured to concrete member 20 once barrier cable 10 is tensioned. In some embodiments, cable angler 50 may be a barrel anchor and washer. In some embodiments, cable angler 50 may be a bracket.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that the present disclosure may be used as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that various changes, substitutions, and alterations herein may be made without departing from the scope of the present disclosure. Likewise, unless an order of steps is explicitly stated, the sequential recitation of steps in the claims that follow is for clarity only and is not a requirement that the steps be performed in the sequence recited.

The invention claimed is:

1. A barrier cable anchor comprising:
   an anchor body, the anchor body including an inner surface and a bore therethrough defined by the inner surface, the anchor body having a first end and a second end;
   a retainer, the retainer having a retainer body and a head, the head having a width greater than that of the retainer body and the retainer body being retained to the anchor body at the first end, the head positioned outside the bore of the anchor body and at an end of the retainer body;
   an anchor plate, the anchor plated fitted about the first end of the anchor body, the anchor plate having a hole therethrough, the anchor plate positioned such that a portion of the retainer passes through the anchor plate;
   a collar, the collar having a collar outer surface, the collar positioned at least partially within the anchor body at the second end, the collar including a tapered inner surface;
   one or more wedges positioned within the tapered inner surface of the collar; and
   a nut engaging the collar and retained to the anchor body.

2. The barrier cable system of claim 1 wherein the retainer body includes a threaded pin end, the head having a width greater than that of the pin end, and wherein the pin end is retained to the inner surface of the anchor body.

3. The barrier cable anchor of claim 1 wherein the retainer body includes a threaded box, the head having a width greater than that of the box, and wherein the box is retained to the outer surface of the anchor body.

4. The barrier cable anchor of claim 1 wherein the nut includes a driving head and an outer surface, and wherein the outer surface of the nut is retained to the inner surface of the anchor body.

5. The barrier cable anchor of claim 1 wherein the collar outer surface is not threaded.

6. The barrier cable anchor of claim 1, further comprising:
   a cap retained to the anchor body at the second end, the cap being separate from the retainer; and
   a spring positioned between the cap and the one or more wedges.

7. The barrier cable anchor of claim 1, further comprising an end plug inserted into the anchor body at the second end.

8. The barrier cable anchor of claim 1, wherein the retainer is a bolt.

9. The barrier cable anchor of claim 1, wherein the retainer includes a female end, wherein the female end is configured to pass through the hole in an anchor plate and threadably engage an outside of the anchor body.

10. The barrier cable anchor of claim 1, wherein the hole in the anchor plate has a width at least as great as that of the bore but not greater than an outside width of the anchor body.

11. The barrier cable anchor of claim 1, wherein the nut has a threaded outer surface.

12. The barrier cable anchor of claim 11, wherein the threaded outer surface of the nut is configured to mate with a threaded inner surface of the anchor body.

13. The barrier cable anchor of claim 1, wherein a diameter of the collar tapered inner surface is smallest where the collar is retained by the nut.

14. A barrier cable system comprising:
   a barrier cable;
   a first concrete member and a second concrete member, each concrete member including:
   a barrier cable anchor, each barrier cable anchor positioned within the hole of an anchor plate, each barrier cable anchor coupling the barrier cable to the respective concrete member, each barrier cable anchor including:
      an anchor body, the anchor body including an inner surface and a bore therethrough defined by the inner surface, the anchor body having a first end and a second end;
      a retainer, the retainer having a retainer body and a head, the head having a width greater than that of the retainer body and the retainer body being retained to the anchor body at the first end, the head positioned outside the bore of the anchor body and at an end of the retainer body;
      an anchor plate, the anchor plated fitted about the first end of the anchor body, the anchor plate having a hole therethrough, the anchor plate positioned such that a portion of the retainer passes through the anchor plate;
      a collar, the collar having a collar outer surface, the collar positioned at least partially within the anchor body at the second end, the collar including an inner surface;
      one or more wedges positioned within the inner surface of the collar; and
      a nut engaging the collar and retained to the anchor body.

15. The barrier cable anchor of claim 14 wherein the retainer body includes a threaded box, the head having a width greater than that of the box, and wherein the box is retained to the outer surface of the anchor body.

16. The barrier cable system of claim 14 wherein the retainer body includes a threaded pin end, the head having a width greater than that of the pin end, and wherein the pin end is retained to the inner surface of the anchor body.

17. The barrier cable anchor of claim 14 wherein the nut includes a driving head and an outer surface, and wherein the outer surface of the nut is retained to the inner surface of the anchor body.

18. The barrier cable anchor of claim 17, wherein the driving head is adapted for engagement by a tensioning wrench.

19. The barrier cable system of claim 14, further comprising:
   a cap retained to the anchor body; and a spring positioned between the cap and the one or more wedges.

20. The barrier cable system of claim 14 wherein the collar outer surface is not threaded.

21. A method for coupling a barrier cable to a concrete member, the method comprising:
   a) coupling an anchor plate to the concrete member;
   b) assembling a barrier cable anchor to the anchor plate comprising the steps of:
   i) supplying an anchor body, the anchor body including an inner surface, the inner surface defining a bore;
   ii) inserting a retainer through the anchor plate, the retainer having a retainer body and a head, the head having a width greater than that of the retainer body and the retainer body being retained to the anchor body, wherein the head protrudes from the anchor body;
   iii) inserting one or more wedges and a collar at least partially into the anchor body; and
   iv) providing a nut, the nut engaging the collar and retained to the inner surface of the anchor body;
   c) inserting a barrier cable into the barrier cable anchor and the collar so as to engage the wedges; and
   d) tensioning the barrier cable by advancing the collar into the anchor body.

22. The method of claim 21 wherein step c) is performed before step b.iii).

23. The method of claim 21 wherein step b) further includes before step b.iii)
   iia) inserting a cap into the anchor body and retaining the cap at a point within the bore of the anchor body; and
   iib) inserting a spring into the anchor body between the cap and the wedges.

24. The method of claim 21 wherein the collar has a collar outer surface that is not threaded and step b.iii) comprises sliding the collar into the anchor body.

25. The method of claim 24 wherein the nut has a threaded outer surface and the anchor body has a threaded inner surface and step b.iv) comprises threading the nut into the anchor body.

26. The method of claim 25 wherein the nut threadedly engages the anchor body and step d) comprises rotating the nut.

27. The method of claim 23 further comprising inserting an end plug into the anchor body after step d).

* * * * *